United States Patent [19]

Hamill et al.

[11] 3,758,681
[45] Sept. 11, 1973

[54] ANTIFUNGAL ANTIBIOTIC A-9145 AND PROCESS FOR PRODUCTION THEREOF

[75] Inventors: Robert L. Hamill, New Ross; Marvin M. Hoehn, Indianapolis, both of Ind.

[73] Assignee: Eli Lilly and Company, Indianapolis, Ind.

[22] Filed: May 22, 1972

[21] Appl. No.: 255,864

Related U.S. Application Data

[63] Continuation-in-part of Ser. No. 57,438, July 23, 1970, abandoned.

[52] U.S. Cl.................................. 424/118, 195/80
[51] Int. Cl............................................ A61k 21/00

[58] Field of Search...................... 424/118; 195/80

*Primary Examiner*—Jerome D. Goldberg
*Attorney*—Everet F. Smith, William B. Scanlon et al.

[57] ABSTRACT

Antibiotic A-9145 produced by culturing Streptomyces griseolus NRRL 3739 in a nutrient culture medium under submerged aerobic fermentation conditions is recovered therefrom and obtained as a white amorphous water-soluble powder. Antibiotic A-9145 forms acid addition salts with pharmaceutically acceptable acids and inhibits growth of bacteria and fungi, especially Candida albicans.

3 Claims, 1 Drawing Figure

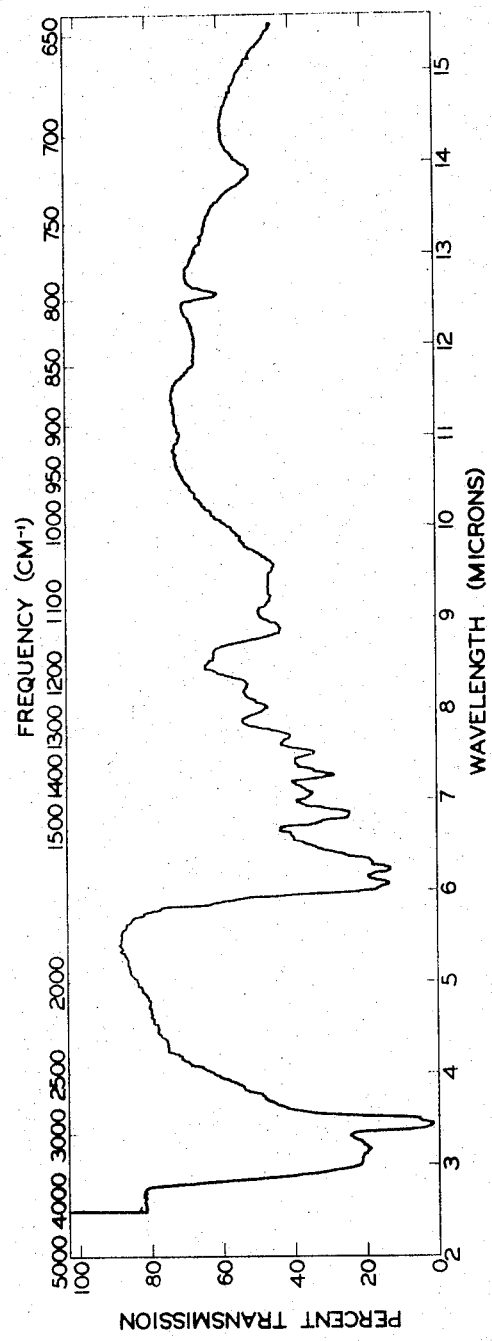

ANTIFUNGAL ANTIBIOTIC A-9145 AND PROCESS FOR PRODUCTION THEREOF

CROSS-REFERENCE TO RELATED APPLICATION

This application is a continuation-in-part application of U.S. Pat. application Ser. No. 57,438, filed July 23, 1970, now abandoned.

SUMMARY

This invention relates to a novel antibiotic and to a method for its production. In particular this invention relates to a basic, nitrogenous antibiotic having valuable antifungal properties and to a method for its production.

The antibiotic substance of this invention, arbitrarily designated herein as antibiotic A-9145, is produced by culturing the organism *Streptomyces griseolus* NRRL 3739 in an aqueous nutrient culture medium containing assimilable sources of carbon, nitrogen and inorganic salts under submerged aerobic fermentation conditions. The fermentation is carried out at a temperature of about 30° C. for about 2 to 4 days during which substantial antibiotic activity is produced.

The antibiotic A-9145 is recovered from the fermentation medium and isolated suitably by adsorption on a cationic exchange resin and elution therefrom with a dilute mineral acid. The antibiotic can be purified by chromatography over a non-ionic adsorbent such as carbon or cellulose and obtained as a water-soluble white amorphous powder. With pharmaceutically acceptable acids, it forms salts such as the acid addition salts formed with hydrochloric acid, sulfuric acid and other inorganic acids and the acid addition salts formed with organic acids such as the acetate, maleate, citrate and the like.

The antibiotic and the acid addition salts thereof inhibit the growth of microorganisms which are pathogenic to animal and plant life. In particular A-9145 inhibits the growth of a variety of fungi and is especially useful in inhibiting the growth of *Candida albicans* both in vitro and in vivo.

DETAILED DESCRIPTION

Antibiotic A-9145 is a white amorphous powder, highly soluble in water and substantially insoluble in methanol, ethanol, the higher alcohols and most common organic solvents. Elemental analysis of a smaple of A-9145 gives the following approximate percentage composition: C, 46.47; H, 6.8; N, 22.28; O, 26.22

Electrometric titration of a sample of the antibiotic dissolved in 66 percent aqueous dimethylformamide shows the presence of four titratable groups having pK'a values of 2.9, 3.9, 8.9 and 10.2. The apparent molecular weight as calculated from the titration data is approximately 510.

The infrared absorption spectrum of A-9145 in a mineral oil mull is shown in the accompanying drawing and contains absorption maxima at the following observed values over the range of 2.5 to 13.0 microns: 3.0, 3.15, 5.85, 6.00, 6.02, 6.07, 6.22, 6.30, 6.74, 6.83, 7.07, 7.26, 7.32, 7.52, 7.69, 8.01, 8.27, 8.88, 9.2, 9.57, 11.0, 11.8 and 12.56.

The ultraviolet absorption spectrum of A-9145, in an aqueous solution containing 0.170 mg. of A-9145 in 10 ml. of water shows the following absorption maxima at the indicated pH:

neutral pH
  206 m$\mu$, $E_{1cm.}^{1\%}$     520
  258 m$\mu$, $E_{1cm.}^{1\%}$     325
acidic pH
  256 m$\mu$, $E_{1cm.}^{1\%}$     325
basic pH
  258 m$\mu$, $E_{1cm.}^{1\%}$     325

Antibiotic A-9145 is a basic substance which is absorbed on the acidic resins, for example, the cationic exchange resins of the IRC 50 type.

A-9145 reacts with acetic anhydride to form multiple acetyl derivatives. For example, A-9145 reacts with acetic anhydride in methanol at room temperature to form an acetylated product containing approximately three acetyl groups pr molecule. When A-9145 is reacted with acetic anhydride in pyridine at room temperature, the reaction product contains approximately six acetyl groups per molecule. The infrared absorption spectra and nuclear magnetic resonance spectra of the tri- and hexa-acetyl products indicate that they are O-acetyl derivatives. However, when the antibiotic is reacted with acetic anhydride in pyridine at the reflux temperature, a mixture of O-acetyl and N-acetyl products results. The U.V. spectrum of the latter acetylated product shows absorption characteristics of an N-acetyladenine.

The antibiotic forms pharmaceutically acceptable salts with suitable inorganic acids such hydrochloric acid, sulfuric acid, phosphoric acid and the like; and with suitable organic acids such as maleic, tartaric, acetic, propionic, succinic, citric, methanesulfonic, naphthalenesulfonic and the like. A-9145 also forms a bright yellow picrate which melts at about 160°-162° C. after crystallization from hot water.

Addition of a saturated aqueous solution of p-hydroxy-azobenzene sulfonic acid to an aqueous solution of A-9145 affords a bright orange crystalline precipitate of the p-hydroxyazobenzene-sulfonate salt of antibiotic A-9145, melting at about 220°-222° C. after recrystallization from water.

A powder X-ray diffraction pattern of the p-hydroxyazobenzene sulfonate salt of A-9145, using vanadium filtered chromium radiation and a wave-length value of 2.2896 A for calculating the interplanar spacings, gives the following intensity values:

| d | $I/I_1$ |
|---|---|
| 17.50 | .30 |
| 10.68 | .40 |
| 8.02 | .20 |
| 5.76 | 1.00 |
| 5.52 | .50 |
| 5.10 | .40 |
| 4.73 | .10 |
| 3.85 | .10 |
| 3.70 | .05 |
| 3.52 | 1.00 |
| 3.12 | .30 |
| 2.67 | .05 |

The behavior of antibiotic A-9145 on a number of paper chromatograms employing different solvent systems for development is shown below in Table I. Whatman No. 1 paper was employed except where otherwise indicated. The loaction of the antibiotic following development of the chromatogram was determined by a bioautograph with the organism *Saccharomyces pastorianus*.

TABLE I.—PAPER CHROMATOGRAPHY OF ANTIBIOTIC A-9145

| Solvent system | Rf value [1] |
| --- | --- |
| Butanol saturated with water | 0 |
| Butanol saturated with water plus 2 percent p-toluenesulfonic acid | .08 |
| Water saturated with butanol. Whatman No. 4 paper | .19 |
| Water saturated with butanol plus 2 percent p-toluenesulfonic acid Whatman No. 4 paper | .9 |
| Water:methanol:acetone (12:3:1) adjusted to pH 10.5 with NH₄OH and then to pH 7.5 with phosphoric acid | .55 |
| 80 percent ethanol with 1.5 percent sodium chloride and Whatman No. 4 paper impregnated with 1N sodium sulfate buffer | .07 |
| Methanol:0.1 N hydrochloric acid (3:1) | .47 |
| Ten percent aqueous propanol | .09 |
| Methanol:.05 M sodium citrate at pH 5.7 (70:30) with paper buffered with .05 M sodium citrate at pH 6.7 | .34 |

[1] Rf value is the ratio of the distance traveled by the antibiotic from the origin to the distance traveled by the solvent front from the origin.

Stability studies carried out on substantially pure antibiotic A-9145 in aqueous solution over the pH range from pH 3 to pH 9 at a temperature of about 25° C. showed no decomposition and little loss in activity.

The free base of antibiotic A-9145 has an inhibitory action against the growth of microbial organisms, both bacteria and fugi, which are pathogenic to animal and plant life. It is particularly effective in inhibiting the growth of pathogenic fungi both in vitro and in vivo. For example, the minimum inhibitory concentration of A-9145 expressed in mcg./ml., as determined in the standard agar dilution test, for three illustrative organisms is as follows: *Ceratostomella ulmi*, 100; *Helminthosporium sativum*, 100; *Penicillium expansum*, 100. In the standard paper disc assay method a 100 mcg./ml. solution of A-9145 produced a 35 mm. zone and a 25 mm. zone of inhibition against *Saccharomyces pastorianus* and *Candida tropicalis*, respectively.

The antibiotic is particularly inhibitory for the growth of the pathogenic fungus, *Candida albicans*. For example, the growth of *Candida albicans* in Sabouraud's broth was inhibited 64 percent when the concentration of A-9145 was 0.019 mcg./ml. The extent of growth inhibition was measured spectrophotometrically by determining the percent light transmittance at 660 m$\mu$ compared to a control broth.

When administered orally or parenterally to warm blooded mammals, antibiotic A-9145 is effective in combating systemic fungal infections. The in vivo antifungal activity of A-9145 is demonstrated by the following data obtained when A-9145 was administered to mice infected with *C. albicans* A-26. The data were obtained from tests carried out in the following manner. Two groups of mice, one a control group, were exposed to a sublethal dose of X-irradiation 24 hours prior to infection with *C. albicans* A-26. Infection was accomplished by the intravenous administration of 1.5 × 10⁶ cells of *C. albicans* per mouse. The mice of the treatment group were administered anitbiotic A-9145 by various routes at 0, 2, 24 and 26 hours post infection. The control group of mice received no antibiotic. The in vivo antifungal activity was determined by comparing the average survival time of the treatment group with the average survival time of the control group. Table II shows the results obtained in the above test.

TABLE II

| Total dose[1] (mg./kg.) | Route of administration | Average Survival Time Beyond Control (percent)[2] |
| --- | --- | --- |
| 30 | Subcutaneous | 128 |
| 40 | Intraperitoneal | 130 |
| 10 | Oral (gavage) | 69 |

[1] The total dose is the sum of the four equal doses administered at 0, 2, 24 and 26 hours post infection.
[2] The Average Survival Time Beyond the Control group is the average survival time of the treated group of mice compared to the average survival time of the control group of mice expressed as a percentage. The average survival time of each group is the sum of the survival time of each mouse in the group divided by the total number of mice in the group.

The antibiotic A-9145 is a relatively non-toxic substance having an $LD_{50}$ of $184.9 \pm 11.3$ mg./kg. when injected subcutaneously in mice.

Antibiotic A-9145 is effective in combating systemic infections of *C. albicans* when administered orally or subcutaneously in a single dose of from about 20 mg./kg. to about 100 mg./kg. If desired, a dose regimen comprising periodic administration of smaller doses, as, for example, a dose of about 1 mg./kg. to about 5 mg./kg. two or three times daily, can be employed to obtain the desired antifungal effect.

The antibiotic can be administered by the parenteral route as an isotonic solution, as for example in isotonic saline. For oral administration the antibiotic can be suitably formulated as well known in the art, as, for example, in capsules, tablets, or as a suspension of an insoluble salt form.

Antibiotic A-9145 is also effective in combating the growth of organisms pathogenic to plant life. For example, the antibiotic is effective for the control of several pathogens causing disease states in economically important plants. Table III lists several illustrative diseases, and the causative organisms thereof against which A-9145 demonstrates activity in the indicated test plant.

TABLE III

| Disease | Causative Organism | Test Plant |
| --- | --- | --- |
| Powdery Mildew | *Erysiphe polygoni* | Bean |
| Bean Rust | *Uromyces phaseoli* var. *typico* | Bean (Pinto) |
| Anthracnose | *Colletotrichum lagenarium* | Cucumber |
| Crown Gall | *Agrobacterium tumefaciens* | Tomato |
| Bacterial Blight | *Xanthomonas phaseoli* var. *sojensis* | Soybean |

In the case of foliar plant diseases such as powdery mildew, bean rust, anthracnose and bacterial blight, the antibiotic is preferably applied to the diseased plant as a foliar spray by employing an aqueous spray solution of the antibiotic at a concentration of from about 50 to about 400 ppm. The aqueous spray solution desirably also contains a wetting agent to allow more even distribution of the antibiotic over the leaf surface. In the case of plant diseases such as crown gall, drench or spray of an aqueous solution of the antibiotic at a concentration of from about 10 to about 200 ppm. is applied to the locus of the infected plant.

Antibiotic A-9145 is also effective in preventing the development of disease symptoms in plants exposed to the disease causing organism and treated prior to the development of disease symptoms.

The antibiotic A-9145 is produced by culturing an A-9145 producing strain of the organism *Streptomyces griseolus* under submerged aerobic fermentation conditions in a nutrient medium containing assimilable sources of carbon, nitrogen and inorganic salts until a substantial level of antibiotic activity is obtained. The antibiotic is isolated from the filtered fermentation broth, suitably by chromatography over a cationic exchange resin of the IRC-50 type, and can be purified further, as for example by chromatography over a nonionic type adsorbent such as carbon.

The A-9145 producing organism was isolated from a soil sample acquired from the Ivory Coast region of the continent of Africa and can be obtained from the culture collection maintained by the United States Department of Agriculture, Agricultural Research Service, Northern Utilization Research and Development Division located at 1815 North University Street, Peoria, Illinois 61604, where it is deposited without restriction as to public availability and has been assigned the accession number, NRRL 3739.

The organism has been classified as a strain of *Streptomyces griseolus* (Waksman), Waksman and Henrici, S. A. Waksman, 1961. The Actinomycetes, Vol. 2, Classification, Identification and Description of Genera and Species. The Williams and Wilkings Co., Baltimore, Md. Other species of *Streptomyces* similar to *S. griseolus* are *S. antibioticus* and *S. aureofaciens*. However, they are differentiated from the A-9145 producing microorganism in that *S. antibioticus* produces a melanin pigment and *S. aureofaciens* may produce spiral sporophores on some media and a soluble yellow pigment.

*S. griseolus* NRRL 3739 produces long flexuous sporophores and short cylindrical spores which are yellow gray to gray en masse. The vegetative mycelium is yellow to grayish yellow. Although the vegetative mycelium may fragment in liquid culture media, a characteristic of the *Nocardia* species, cell wall analysis according to the procedure described by Becker et al. Appl. Microbiol. 12, 421-423 (1964) indicates the presence of only the L,L isomer of diaminopimelic acid, a characteristic of the *Streptomyces* genus. The A-9145 producing organism is assigned to the Rectus-Flexibilis Gray series of Pridham et al., Appl. Microbiol. 6, 52-79 (1958) and to the Gray series of the Tresner and Backus system, Appl. Microbiol. 11, 335-338 (1963).

The following paragraphs contain a description of the morphological and cultural characteristics of *S. griseolus* NRRL 3739. The methods recommended for the International Streptomyces Project for the characterization of *Streptomyces* species have been employed along with certain supplementary tests. Shirling and Gottlieb, Intern. Bull. Systematic Bacteriol., 16, 313-340 (1966). Color names were assigned according to the ISCC-NBS method, Kelly and Judd, The ISCC-NBS Method of Designating Colors and a Dictionary of Color Names. U.S. Dept. of Commerce Circ. 553 (1955), Washington, D.C. Figures in parentheses refer to the Tresner and Backus color series, op. cit., and color tab designations are underlined. The numbers and letters in brackets refer to the Maerz and Paul color blocks, Dictionary of Color, 1955 McGraw-Hill Book Co., Inc., New York. Cultures were grown at a temperature of 30° C. for 14 days unless otherwise noted.

Morphological characteristics of *S. griseolus* NRRL 3739: sporophores are long and flexuous; spores are oval to short cylindrical in shape, measuring 1.0 to 2.5 by 0.5 to 1.0 microns and are smooth when observed by the electron microscope. The spores usually occur in chains of greater than 50.

Cultural characteristics of *S. griseolus* NRRL 3739 on various culture media:

| Culture Medium | Growth Characteristics |
|---|---|
| ICP[1] No. 2 agar | Abundant growth, reverse, medium dark grayish yellow [13E4]; aerial mycelium and sporulation is abundant, light grayish reddish brown, (GY) 5fe [5C7]; no soluble pigment. |
| ICP No. 3 agar | Good growth, reverse medium grayish yellow [20 C1]; aerial mycelium and sporulation good, yellowish gray (GY) 2dc [27A1]; no soluble pigment. |
| ICP No. 4 agar | Good growth, reverse medium, moderate yellow, [1I2]; fair to good aerial mycelium and sporulation, light gray to white, (GY) d (W) b [35A2]; slight brown soluble pigment is produced. |
| ICP No. 5 agar | Good growth, reverse medium, light yellow brown [13E6]; good aerial mycelium and sporulation, yellowish gray (GY) 2dc [12A3]; no soluble pigment produced. |
| Bennett's agar | Good growth, reverse medium, orange yellow [11J7]; scant aerial mycelium and sporulation, grayish yellowish pink (R) 5ec ]11A4]; no soluble pigment produced. |
| Glycerol-Glycine | Good growth, reverse medium, light grayish olive [14H4]; scant aerial mycelium and sporulation, white (W) a [42A1]; scant olive brown pigment. |
| Tryptone-yeast agar | Growth was too poor for color assignment. |
| Czapek's agar | Poor vegetative growth, reverse medium, white [42A1]; poor aerial mycelium and sporulation prevented a color designation. |
| Calcium malate agar | Good growth, reverse medium, grayish yellow [12B2]; no aerial mycelium or sporulation. A slight yellow pigment was observed. |
| Nutrient agar | Good growth, reverse medium, grayish yellow [12C1]; no aerial mycelium or sporulation; no soluble pigment |
| Emerson's agar | Abundant growth, reverse medium strong yellowish brown [13J8]; scant aerial mycelium and sporulation; white (W) b ]42A1]; no soluble pigment. |
| Tomato paste-oatmeal agar | Abundant growth, reverse medium, light grayish olive [15J5]; abundant aerial mycelium and sporulation; light gray (GY) d [44A2], also some white area (W) b; no soluble pigment. |
| Glucose Asparagine agar | Good growth, reverse medium grayish greenish yellow [12E2]; good aerial mycelium and sporulation, yellowish gray (GY) 2dc [27A1]; no soluble pigment. |
| Tyrosine agar | Good growth, reverse medium, grayish greenish yellow [12E2]; good aerial mycelium and sporulation development; yellowish gray (GY) 2dc [27A1], no soluble pigment. |

[1] International Styreptomyces Project medium Additional cultural characteristics:

| Test | Results |
|---|---|
| Nitrate reduction | positive |
| Action on milk | Coagulation at 14 days and slight clearing |
| Gelatin liquefaction | Complete at 14 days |
| Whole cell hydrolysate | LL-diaminopimelic acid only |
| Melanin production in | |
| a. Tryptone yeast extract broth | negative |
| b. Tyrosine agar | negative |

| Test | Results |
|---|---|
| Temperature requirements: | |
| Tomato paste-oatmeal agar | Growth from 26° to 37° C; no growth at about 43° C. |

| | |
|---|---|
| Stab culture for oxygen requirement on ICP No. 2 | No growth below surface; aerobic. |

Table IV contains the observed results of experiments carried out to determine the carbon utilization characteristics of S. griseolus NRRL 3739.

TABLE IV

Carbon Utilization by S. griseolus NRRL 3739

| Carbon Source | Utilization[1] |
|---|---|
| Rhamnose | − |
| Cellobiose | − |
| Raffinose | − |
| Sucrose | (+) |
| L-arabinose | (+) |
| Cellulose | − |
| i-inositol | 31 |
| D-xylose | − |
| D-fructose | + |
| D-mannitol | − |
| D-dextrose | + |

[1] Utilization code:
− negative
(+) probable utilization
+ positive

PREPARATION OF A-9145

The A-9145 producing organism, S. griseolus NRRL 3739, was isolated from the soil sample by serial dilution and transferred to a nutrient agar slant for culturing. In producing the antibiotic, a small amount of growth on the agar slant is transferred with a sterile platinum loop to a vegetative culture medium. The inoculated vegetative medium is then incubated until substantial growth develops. The cultured vegetative medium is employed a the inoculum for the production medium. It is preferable to employ the growing vegetative medium as the inoculum for the production medium rather than spores from the agar slants because, when a spore inoculum is used, a considerable time lag is observed prior to antibiotic production during the fermentation. The cultured vegetative medium, on the other hand, is a viable growing culture of the organism and its use as inoculum results in a shorter start up time for the production fermentation.

The A-9145 producing organism S. griseolus NRRL 3739 can be grown in any one of a number of nutrient media containing assimilable sources of carbon, nitrogen and inorganic salts. Carbon sources such as the carbohydrates sucrose, fructose and glucose can be employed; however, for economy of production molasses is a desirable carbohydrate source. Nitrogen sources which are suitable media ingredients include corn steep, soybean meal, peptones, casein hydrolysates, distiller's solubles, casein, amino acid mixtures, and the like. Inorganic salts which can be employed as nutrient constitutents include the usual salts capable of yielding sodium, ammonium, potassium, calcium, chloride, phosphate, sulfate, acetate, carbonate and like ions. Additionally, various essential trace elements should also be included in the culture medium for the growth of the A-9145 producing organism of this invention. Such trace essential elements are usually supplied as impurities along with other medium constituents. Sources of growth enhancing factors such as yeast extracts and beef extracts can also be included in the mediua.

The A-9145 producing organism S. griseolus NRRL 3739 can be grown under varying conditions of temperature and pH. For example, the organism will grow over the pH range of from about pH 6.0 to about pH 8.5. However, prior to inoculation with the organism, it is preferable to adjust the pH of the culture medium to between about pH 6.0 and pH 7.5. As is commonly observed with other actinomycetes, the pH of the fermentation medium gradually increases and may reach a value of from about pH 8.0 to about pH 8.5 during the production of A-9145.

The organism can be grown well at temperatures between about 26+ C. and about 35° C. The preferred temperature range for optimal production of the antibiotic appears to be about 28° C. to about 32° C.

For large scale production of A-9145, submerged aerobic fermentation in large fermentors is employed. smaller quantities of the antibiotic are obtained conveniently by shake flask fermentations of from one-liter to 25-liter capacity.

In carrying out the A-9145 fermentation by submerged aerobic fermentation, sterile air is blown through the agitated culture medium. For efficient growth of the organism and production of the antibiotic, the volume of sterile air blown through the medium in large tank fermentations is upwards of 0.2 volume of air per volume of culture medium per minute. More efficient growth of the organism and antibiotic production is obtained when the volume of air employed is about 0.5 volume of air per volume of culture medium per minute.

The progress of the fermentation and the level of antibiotic acitivity in the culture medium can be followed during the growth period by testing samples of the culture medium for their antibiotic activity against organisms known to be sensitive to the antibiotic. One such organism is Saccharomyces pastorianus ATCC 2366. The bioassay can be carried out by standard assay procedures, for example, the turbidimetric method or the paper disc assay method. In general, maximum production of the antibiotic occurs within about two to five days when submerged aerobic fermentation is carried out in large tanks or shake flasks.

Antibiotic A-9145 can be recovered from the fermentation medium by employing extractive and adsorptive techniques. Adsorptive techniques are preferable to extraction procedures because the latter generally require the use of large volumes of solvents.

Cationic exchange resins, such as the resins of the polystyrenesulfonic acid and methacrylic carboxylic acid type, for example, IRC-50 can be employed as adsorbents for the recovery and isolation of antibiotic A-9145.

The A-9145 containing fermentation medium is first filtered to remove the mycelium. The use of a filter acid such as kieselguhr is desirably employed in the filtration. The filtered broth is then passed over a cationic exchange resin, preferably IRC-50 in the hydrogen cycle, and the resin containing the adsorbed antibiotic is washed with water to remove impurities. The antibiotic is then eluted from the resin with dilute mineral acid. The preferred acid is sulfuric acid at a normality of about 0.05 N. The eluate fractions containing antibiotic activity are combined and neutralized by the addition of base, such as an alkali metal hydroxide or an alkaline earth metal hydroxide. Barium hydroxide is the preferred base because the neutralized sulfuric acid precipitates as the insoluble barium salt and is easily removed from the eluate by filtration.

The antibiotic is recovered from the neutralized eluate as the free base by concentration of the eluate in vacuo to a low volume. Upon the addition of a water soluble organic solvent, such as methanol, ethanol or acetone the antibiotic A-9145 precipitates as a solid and is collected by filtration.

The antibiotic preparation thus obtained can be further purified; however, for some purposes it may be desirable for economic reasons to emoloy the antibiotic without further purification.

The antibiotic acn be further purified by chromatography over any of a number of non-ionic adsorbent materials such as activated carbon, cellulose, dextran, silica gel, and alumina. The antibiotic is preferably obtained in a substantially pure state by successive chromatography over carbon, microcellulose and dextran adsorbents or alternatively over carbon followed by chromatography over Dowex 50 ($NH_4$). A preferred adsorbent is carbon and the antibiotic is preferably eluted from the carbon with acetone:water (3:7 v/v). The prferred cellulose adsorbent is a microcellulose. The antibiotic is eluted from the cellulose with acetonitrile:water (1:1, v:v). In the final purification step, the antibiotic A-9145 obtained from the column is optionally washed with water through a column or filter packed with dextran to remove any remaining inorganic impurities which may be present. The active factions are combined and concentrated to a small volume. A water miscible organic solvent such as methanol is added to the antibiotic aqueous concentrate to form a solid precipitate of A-9145 in its substantially pure state.

The present invention is further illustrated by the following specific examples.

EXAMPLE 1

Spores of *Streptomyces griseolus* strain NRRL 3739 are inoculated on a nutrient agar slant having the following composition:

| Ingredient | Weight (g.) |
|---|---|
| Dextrin | 10 |
| Casein hydrolysates[1] | 2 |
| Beef extract | 1 |
| Yeast extract | 1 |
| Agar | 20 |
| Water (Q.S. to a volume of one liter) | |

[1] Pancreatic hydrolysate of casein. (N-Z Amine A Sheffield Chemical Co., Norwich, N.Y.)

The slant is incubated for 5 days at a temperature of 30° C. The mature slant culture is covered with a small amount of sterile distilled water and is scraped gently to loosen the spores.

One ml. of the resulting spore suspension is used to inoculate 100 ml. of a sterile vegetative growth medium having the following composition:

| Ingredient | Weight (g.) |
|---|---|
| Glucose | 15 |
| Soybean meal | 15 |
| Corn steep solids | 5 |
| Calcium carbonate | 2 |
| Sodium chloride | 5 |
| Water, q.s. to make one liter | |

The inoculated vegetative medium is grown for 48 hours at 30° C. with constant shaking on a reciprocal shaker with a 2-inch stroke at 108 rpm. to produce the vegetative form of the organism. (A rotary shaker operating at 250 rpm. can also be used.) This vegetative inoculum is then employed to inoculate a sterile production culture medium having the following composition. The percentages shown are expressed on a weight-per-volume basis:

| Ingredient | Percent |
|---|---|
| Glucose | 1.0 |
| Dextrin | 3.0 |
| Soybean meal (grits) | 1.5 |
| Edible molasses | 0.5 |
| Brewer's Yeast Extract[1] | 0.5 |
| Calcium carbonate | 0.2 Water Eater added to a volume of 25 liters. |

[1] Amber BYF 300, Amber Laboratories, Juneau, Wisconsin.

The inoculated culture medium contained in a 30-liter fermentation tank is allowed to ferment at a temperature of about 30°C. Throughout the fermentation period the medium is stirred and aerated with sterile air in an amount of about one-half vome of air per volume of culture medium per minute. The fermentation is allowed to continue for about 3 days, during which time the culture medium gradually increases in pH from an initial level of about pH 6.5 to about pH 7.3.

80 liters of fermentation broth thus obtained is filtered in vacuo with the aid of 2 percent Hyflo super-cel filter aid to remove the mycelium. The filtered broth containing the antibiotic A-9145 is passed over a column measuring 7 × 100 cm. containing the cationic exchange resin IRC-50 in the hydrogen cycle. The column is washed with ten liters of water and the washings are discarded.

The column containing the adsorbed A-9145 is eluted with 30 liters of 0.05 N sulfuric acid. The eluate is neutralized with a saturated solution of barium hydroxide and the precipitate of barium sulfate is filtered. The filtrate is concentrated in vacuo to a volume of about 100 ml., is then filtered to remove solid impurities and is added to about 2,000 ml. of methanol. The antibiotic precipitates and is filtered and dried in vacuo to yield about 4.5 g. of crude antibiotic A-9145. The crude A-9145 so obtained is dissolved in 100 ml. of water and passed over a column measuring 2 × 70 cm. containing Pittsburgh 12 × 40 carbon. The column is washed with 400 ml. of water until a clear colorless wash is obtained. The antibiotic is eluted from the carbon with acetone:water (3:7). The antibiotic containing eluate is concentrated in vacuo to a volume of about 100 ml. and the concentrate is added to 2 liters of methanol. The antibiotic precipitates and is filtered and dried in vacuo to yield about 2 g. of A-9145.

Two grams of the antibiotic so obtained are dissolved in about 20 ml. of water and the solution is passed over a column measuring 4.7 × 60 cm. containing microcellulose adsorbent sold commercially under the designation "Avicel" (FMC Corporation, Newark, N.J.). The adsorbent is packed into the column with acetonitrile:water (7:3). The column containing the adsorbed antibiotic is washed successively with two liters each of acetonitrile:water (7:3) and acetonitrile:water (6.5:3.5). The column is then eluted with acetonitrile:water (1:1) and the antibiotic containing eluate is concentrated to a volume of about 30 ml. The concentrate is diluted with about 60 ml. of methanol and then poured into about 1,800 ml. of dry acetone to precipitate the antibiotic. The precipitate is filtered and dried to yield about 700 mg. of antibiotic A-9145.

Antibiotic A-9145 so obtained is further purified in the following manner: 700 mg. of A-9145 is dissolved in about 25 ml. of water and passed over a column measuring 5.5 × 100 cm. containing Sephadex G-50 (coarse grade). The column is washed with water and the aqueous eluate containing the antibiotic is concentrated to a volume of about 20 ml. The concentrate is diluted with 60 ml. of methanol and is poured into about 1,600 ml. of dry acetone to precipitate the antibiotic. The A–9145 is filtered and dried in vacuo to yield about 530 mg. of white amorphous A–9145 antibiotic powder.

EXAMPLE 2

Acid addition salts of A–9145 are prepared by treating an aqueous solution of the antibiotic, containing a water miscible organic solvent such as methanol, with an equivalent amount of the desired acid in a suitable solvent. The desired salt precipitates directly or upon addition or a water miscible organic solvent such as acetone. The following paragraphs illustrate the preparation of several salts of A–9145.

One hundred milligrams of A–9145 is dissolved in 1 ml. of water and 2 ml. of methanol are added to the solution. The pH of the solution is adjusted to pH 3.8 with 1N hydrochloric acid. Two milliliters of methanol are added to the acidic solution which is then poured into 100 ml. of acetone to precipitate the hydrochloride salt of A–9145. The hydrochloride metls at about 195°–197° C. after recrystallization from ethanol-water. Elemental analysis for chlorine: 8.17 percent.

To a solution of 100 mg. of A–9145 in 1 ml. of water, is added 2 ml. of methanol and the pH of the solution is adjusted to about pH 4.0 with 1 N sulfuric acid. The addition of 3 ml. of water is necessary to maintain solution during the acid addition. The acidic solution is then added to about 120 ml. of methanol to precipitate the sulfate salt of A–9145. The sulfate salt is recrystallized from water-ethanol and melts after recrystallization at about 220°–222° C. Elemental analysis for sulfur; 4.23 percent.

To a solution of 100 mg. of antibiotic A–9145 in 5 ml. of water is added 10 ml. of a saturated aqueous solution of p-hydroxyazobenzenesulfonic acid. The bright orange p-hydroxyazobenzenesulfonate salt of A–9145 precipitates and is separated by centrifuge. The salt is recrystallized from hot water and melts at about 220°–222° C. Elemental analysis for sulfur: 6.92 percent.

We claim:

1. The antibiotic A–9145 or an acid addition salt thereof, said antibiotic being a white, solid, basic substance which is highly soluble in water and is substantially insoluble in methanol, ethanol, propanol and acetone; has the approximate elemental composition of 46.47 percent carbon, 6.8 percent hydrogen, 22.28 percent nitrogen and 26.22 percent oxygen; has four tritratable groups having pK'a values of 2.9, 3.9, 8.9, and 10.2 as determined by electrometric titration in 66 percent aqueous dimethylformamide has an apparent molecular weight of approximately 510 as calculated from titration data; has the following distinguishable bands in its infrared absorption spectrum when taken as a mineral oil mull: 3.0, 3.15, 5.85, 6.00, 6.02, 6.07, 6.22, 6.30, 6.74, 6.83, 7.07, 7.26, 7.32, 7.52, 7.69, 8.01, 8.27, 8.88, 9.2, 9.57, 11.0, 11.8 and 12.56 microns; and has an ultraviolet absorption spectrum in aqueous solution with the following absorption maxima at the indicated pH:

neutral pH $$206 \ m\mu, \ E_{1 \ cm.}^{1\%} = 520$$
$$258 \ m\mu, \ E_{1 \ cm.}^{1\%} = 325$$

acidic pH $$256 \ m\mu, \ E_{1 \ cm.}^{1\%} = 325$$

basic pH $$258 \ m\mu, \ E_{1 \ cm.}^{1\%} = 325$$

2. A method of producing the antibiotic A–9145 as defined in claim 1 which comprises cultivating *Streptomyces griseolus* NRRL 3739 in an aqueous culture medium containing assimilable sources of carbon, nitrogen and inorganic salts, under submerged aerobic conditions until a substantial amount of antibiotic activity is produced by said organism in said culture medium.

3. A method of producing the antibiotic A 9145 as defined in claim 1 which comprises cultivating *Streptomyces griseolus* NRRL 3739 in an aqueous culture medium containing assimilable sources of carbon, nitrogen and inorganic salts, under submerged aerobic conditions until a substantial amount of antibiotic activity is produced by said organism in said culture medium, and recovering the A–9145 from said culture medium.

* * * * *